US012337992B2

(12) United States Patent
Johnson

(10) Patent No.: US 12,337,992 B2
(45) Date of Patent: Jun. 24, 2025

(54) AIRCRAFT TAKEOFF AND LANDING APPARATUS

(71) Applicant: Kara E. Johnson, Stuart, FL (US)

(72) Inventor: Kara E. Johnson, Stuart, FL (US)

(*) Notice: Subject to any disclaimer, the term of this patent is extended or adjusted under 35 U.S.C. 154(b) by 0 days.

(21) Appl. No.: 18/729,200

(22) PCT Filed: Nov. 30, 2023

(86) PCT No.: PCT/US2023/081908
§ 371 (c)(1),
(2) Date: Jul. 16, 2024

(87) PCT Pub. No.: WO2024/118965
PCT Pub. Date: Jun. 6, 2024

(65) Prior Publication Data
US 2025/0108935 A1    Apr. 3, 2025

Related U.S. Application Data

(60) Provisional application No. 63/429,418, filed on Dec. 1, 2022.

(51) Int. Cl.
*B64F 1/35* (2024.01)
*B64U 70/90* (2023.01)

(52) U.S. Cl.
CPC ............... *B64F 1/35* (2024.01); *B64U 70/90* (2023.01)

(58) Field of Classification Search
CPC ........... B64F 1/35; B64U 70/90; B64U 80/25; B64U 50/37; B64U 10/20; B60L 53/14; Y02T 90/12
See application file for complete search history.

(56) References Cited

U.S. PATENT DOCUMENTS 2,395,528 A * 2/1946 Andersen .................. B64F 1/24
    104/44
3,035,528 A * 5/1962 Bolton ...................... B64F 1/24
    104/44
(Continued)

FOREIGN PATENT DOCUMENTS

CN    103754288    4/2014
CN    113071697    7/2021
(Continued)

OTHER PUBLICATIONS

Google, English translation of CN103754288, accessed Jun. 6, 2022 from www.googlepatents.com.
(Continued)

*Primary Examiner* — Medhat Badawi
(74) *Attorney, Agent, or Firm* — ASHLEY LAW FIRM P.C.; Stephen S. Ashley, Jr.

(57) ABSTRACT

An apparatus for facilitating the landing and takeoff of electric vertical takeoff and landing aircraft (EVTOL) can comprise a moveable landing platform, a moveable charging assembly comprising a high voltage cable adapted for electrical, magnetic induction positioned within a vertically moveable column having a magnetic plate and multiple access connections, and weight sensors positioned on the landing platform. The weight sensors are operatively connected to the charging assembly such that when the sensors detect the landing of an EVTOL on the platform, the sensors trigger the charging assembly to rise up to contact the EVTOL and begin charging the EVTOL.

20 Claims, 7 Drawing Sheets

(56) References Cited

U.S. PATENT DOCUMENTS

| | | | | |
|---|---|---|---|---|
| 4,123,020 A * | 10/1978 | Korsak | | B64F 1/00 |
| | | | | 244/116 |
| 5,842,667 A * | 12/1998 | Jones | | B64C 29/0025 |
| | | | | 244/114 R |
| 5,988,564 A * | 11/1999 | Lee | | B64F 1/24 |
| | | | | 244/116 |
| 6,124,554 A * | 9/2000 | Muckle | | G01G 19/083 |
| | | | | 177/126 |
| 7,714,536 B1 * | 5/2010 | Silberg | | B64U 80/25 |
| | | | | 320/108 |
| 8,616,497 B2 * | 12/2013 | Ying | | B64F 1/222 |
| | | | | 244/114 R |
| 9,302,783 B2 * | 4/2016 | Wang | | B64U 80/86 |
| 9,387,928 B1 * | 7/2016 | Gentry | | B64U 50/39 |
| 9,387,940 B2 * | 7/2016 | Godzdanker | | B64F 1/125 |
| 9,460,616 B1 * | 10/2016 | Miyahira | | G08G 1/0112 |
| 9,576,482 B2 * | 2/2017 | Yamamoto | | H04W 4/027 |
| 9,637,233 B2 * | 5/2017 | Bivens | | A01K 29/005 |
| 9,828,093 B2 * | 11/2017 | Raniere | | B64U 50/37 |
| 9,873,408 B2 * | 1/2018 | Capizzo | | G05D 1/12 |
| 10,182,215 B1 * | 1/2019 | Jacob | | G06V 20/176 |
| 10,207,820 B2 * | 2/2019 | Sullivan | | B64U 80/25 |
| 10,239,638 B1 * | 3/2019 | Cohen | | B64F 1/025 |
| 10,274,952 B2 * | 4/2019 | Cantrell | | G05D 1/104 |
| 10,351,235 B2 * | 7/2019 | Karem | | B64C 3/10 |
| 10,457,421 B2 * | 10/2019 | O'Toole | | B60L 53/80 |
| 10,507,938 B2 * | 12/2019 | Raz | | B64U 70/97 |
| 10,543,984 B1 * | 1/2020 | Alduaiji | | B64U 20/40 |
| 10,577,099 B2 * | 3/2020 | Akens | | B64U 50/34 |
| 10,837,786 B2 * | 11/2020 | Tian | | G01C 21/3691 |
| 11,046,459 B2 * | 6/2021 | Stamatovski | | B64U 70/97 |
| 11,053,646 B2 * | 7/2021 | Lewis | | E01C 9/008 |
| 11,180,263 B2 * | 11/2021 | Ratajczak | | G05D 1/106 |
| 11,273,724 B1 * | 3/2022 | Palombini | | B60L 53/51 |
| 11,273,911 B2 * | 3/2022 | Brand | | B64D 27/357 |
| 11,295,141 B1 * | 4/2022 | Nevdahs | | H04N 7/185 |
| 11,328,611 B2 * | 5/2022 | Shannon | | G08G 5/30 |
| 11,352,148 B2 * | 6/2022 | Svirsky | | B64F 1/007 |
| 11,407,527 B2 * | 8/2022 | Ratajczak | | B64U 50/13 |
| 11,440,679 B2 * | 9/2022 | Cowden | | B64U 70/30 |
| 11,636,771 B2 * | 4/2023 | Barker | | B64U 50/39 |
| | | | | 701/16 |
| 11,655,049 B1 * | 5/2023 | Montúfar Chávez | | B64F 1/12 |
| | | | | 244/114 R |
| 11,667,402 B2 * | 6/2023 | Liske | | B64U 70/90 |
| | | | | 244/116 |
| 11,673,690 B2 * | 6/2023 | Dayan | | B64U 80/70 |
| | | | | 244/114 R |
| 11,939,080 B2 * | 3/2024 | Cowden | | B64U 80/30 |
| 11,986,115 B2 * | 5/2024 | Walsh | | B64F 1/362 |
| 12,020,582 B2 * | 6/2024 | Barker | | B65D 21/0215 |
| 12,065,273 B2 * | 8/2024 | Kiyokami | | B64U 10/13 |
| 12,084,211 B2 * | 9/2024 | Li | | B64U 70/99 |
| 2007/0228214 A1 * | 10/2007 | Horak | | B64U 70/99 |
| | | | | 244/63 |
| 2014/0124621 A1 * | 5/2014 | Godzdanker | | B64F 1/28 |
| | | | | 244/110 E |
| 2014/0319272 A1 * | 10/2014 | Casado | | B60L 3/12 |
| | | | | 244/110 E |
| 2015/0069968 A1 * | 3/2015 | Pounds | | B60L 53/35 |
| | | | | 320/109 |
| 2015/0158599 A1 * | 6/2015 | Sisko | | B64F 1/20 |
| | | | | 244/114 R |
| 2015/0175276 A1 * | 6/2015 | Koster | | A47G 29/14 |
| | | | | 244/114 R |
| 2015/0183528 A1 * | 7/2015 | Walsh | | B64C 39/024 |
| | | | | 244/114 R |
| 2016/0011592 A1 * | 1/2016 | Zhang | | G05D 1/10 |
| | | | | 244/114 R |
| 2016/0039300 A1 * | 2/2016 | Wang | | B64D 35/02 |
| | | | | 244/58 |
| 2016/0039541 A1 * | 2/2016 | Beardsley | | B60L 53/14 |
| | | | | 701/2 |
| 2016/0093218 A1 * | 3/2016 | Hale | | G08G 5/20 |
| | | | | 701/120 |
| 2016/0101855 A1 * | 4/2016 | Stefani | | G08G 5/57 |
| | | | | 701/2 |
| 2016/0101874 A1 * | 4/2016 | McKinnon | | A47G 29/14 |
| | | | | 244/114 R |
| 2016/0130000 A1 * | 5/2016 | Rimanelli | | B64U 20/50 |
| | | | | 244/2 |
| 2016/0137293 A1 * | 5/2016 | Santangelo | | B64C 25/32 |
| | | | | 244/50 |
| 2016/0137304 A1 * | 5/2016 | Phan | | B64D 27/02 |
| | | | | 244/17.23 |
| 2016/0144982 A1 * | 5/2016 | Sugumaran | | B64F 1/005 |
| | | | | 244/108 |
| 2016/0159496 A1 * | 6/2016 | O'Toole | | B64F 1/005 |
| | | | | 244/110 E |
| 2016/0185466 A1 * | 6/2016 | Dreano, Jr. | | G06Q 10/083 |
| | | | | 705/26.81 |
| 2016/0196756 A1 * | 7/2016 | Prakash | | B64U 70/95 |
| | | | | 701/3 |
| 2016/0229299 A1 * | 8/2016 | Streett | | B64F 1/222 |
| 2016/0244162 A1 * | 8/2016 | Weller | | B64U 10/13 |
| 2016/0257424 A1 * | 9/2016 | Stabler | | A63H 27/12 |
| 2016/0257426 A1 * | 9/2016 | Mozer | | B64F 1/362 |
| 2016/0311329 A1 * | 10/2016 | Rodriguez | | B60L 58/18 |
| 2016/0364989 A1 * | 12/2016 | Speasl | | G08G 5/57 |
| 2017/0015415 A1 * | 1/2017 | Chan | | G06Q 30/04 |
| 2017/0023949 A1 * | 1/2017 | Fisher | | G08G 5/55 |
| 2017/0050749 A1 * | 2/2017 | Pilskalns | | B60L 53/14 |
| 2017/0073084 A1 * | 3/2017 | Mozer | | B64F 1/02 |
| 2017/0096222 A1 * | 4/2017 | Spinelli | | B64U 80/25 |
| 2017/0121023 A1 * | 5/2017 | High | | B64D 9/00 |
| 2017/0129464 A1 * | 5/2017 | Wang | | H02J 7/0045 |
| 2017/0129603 A1 * | 5/2017 | Raptopoulos | | B64F 1/22 |
| 2017/0144776 A1 * | 5/2017 | Fisher | | B64U 10/25 |
| 2017/0158353 A1 * | 6/2017 | Schmick | | B60L 53/12 |
| 2017/0174343 A1 * | 6/2017 | Erickson | | G16H 40/67 |
| 2017/0225799 A1 * | 8/2017 | Selwyn | | B64F 1/005 |
| 2017/0225802 A1 * | 8/2017 | Lussier | | B64U 10/14 |
| 2017/0240062 A1 * | 8/2017 | Jaiswal | | B64F 1/22 |
| 2017/0253349 A1 * | 9/2017 | Wang | | B64U 70/97 |
| 2017/0275025 A1 * | 9/2017 | Johnson | | B64F 1/362 |
| 2017/0313422 A1 * | 11/2017 | Gil | | B64D 45/04 |
| 2017/0334581 A1 * | 11/2017 | White | | B64D 37/30 |
| 2017/0344000 A1 * | 11/2017 | Krishnamoorthy | | G08G 5/25 |
| 2017/0369184 A1 * | 12/2017 | Di Benedetto | | B64F 1/00 |
| 2018/0009549 A1 * | 1/2018 | Sullivan | | B64F 1/027 |
| 2018/0118340 A1 * | 5/2018 | Russo | | B64U 50/37 |
| 2018/0141680 A1 * | 5/2018 | Heinonen | | B60L 53/80 |
| 2018/0148170 A1 * | 5/2018 | Stamatovski | | B64U 80/25 |
| 2018/0178665 A1 * | 6/2018 | Chen | | B64U 50/37 |
| 2018/0229852 A1 * | 8/2018 | Boss | | B67D 7/845 |
| 2018/0257502 A1 * | 9/2018 | Park | | B60L 53/36 |
| 2018/0312276 A1 * | 11/2018 | Miller | | B64U 10/14 |
| 2019/0002127 A1 * | 1/2019 | Straus | | B64F 1/362 |
| 2019/0002128 A1 * | 1/2019 | Raz | | B64U 70/99 |
| 2019/0023113 A1 * | 1/2019 | Stoltz | | F01K 23/02 |
| 2019/0023416 A1 * | 1/2019 | Borko | | B65G 1/0485 |
| 2019/0039751 A1 * | 2/2019 | Janssen | | G08G 5/55 |
| 2019/0100108 A1 * | 4/2019 | Davis | | B64U 80/84 |
| 2019/0100330 A1 * | 4/2019 | Cheng | | E04H 6/44 |
| 2019/0161190 A1 * | 5/2019 | Gil | | E05F 15/77 |
| 2019/0177005 A1 * | 6/2019 | Kim | | B64U 50/38 |
| 2019/0245365 A1 * | 8/2019 | Farrahi Moghaddam | | |
| | | | | H02J 7/0042 |
| 2019/0276140 A1 * | 9/2019 | Poltorak | | B64U 50/19 |
| 2019/0291961 A1 * | 9/2019 | Urban | | G06Q 50/40 |
| 2019/0315235 A1 * | 10/2019 | Kung | | B64U 50/39 |
| 2019/0337407 A1 * | 11/2019 | Wang | | B60L 53/31 |
| 2019/0348862 A1 * | 11/2019 | Obayashi | | H02J 50/90 |
| 2020/0019878 A1 * | 1/2020 | Osogami | | G06N 7/01 |
| 2020/0055613 A1 * | 2/2020 | Miller | | G05D 1/0676 |
| 2020/0130864 A1 * | 4/2020 | Brockers | | B64U 50/19 |
| 2020/0165008 A1 * | 5/2020 | Krauss | | B64U 80/25 |
| 2020/0207484 A1 * | 7/2020 | Foggia | | B64U 70/92 |
| 2020/0244087 A1 * | 7/2020 | Yang | | B64U 50/37 |
| 2020/0288895 A1 * | 9/2020 | Bennet | | H04W 12/08 |
| 2021/0053677 A1 * | 2/2021 | Passley | | B64U 70/95 |

(56) References Cited

U.S. PATENT DOCUMENTS

| | | | |
|---|---|---|---|
| 2021/0074170 A1* | 3/2021 | Barker | B64U 70/90 |
| 2021/0107682 A1* | 4/2021 | Kozlenko | B64U 70/30 |
| 2021/0107684 A1* | 4/2021 | Le Lann | B60L 53/52 |
| 2021/0125503 A1* | 4/2021 | Henry | G06F 3/04817 |
| 2021/0148131 A1* | 5/2021 | Wankewycz | B64U 70/92 |
| 2021/0163135 A1* | 6/2021 | Shin | B64U 70/97 |
| 2021/0171218 A1* | 6/2021 | Scherz | B64U 80/25 |
| 2021/0309388 A1* | 10/2021 | Ratajczak | B60L 53/36 |
| 2021/0347275 A1* | 11/2021 | Chakraborty | G06Q 10/06315 |
| 2022/0067606 A1* | 3/2022 | Warmoth | G06Q 10/06311 |
| 2022/0073214 A1* | 3/2022 | Liske | B64U 50/19 |
| 2022/0108235 A1* | 4/2022 | Schulz | G06Q 10/025 |
| 2022/0169400 A1* | 6/2022 | Seeley | B64U 20/20 |
| 2022/0396373 A1* | 12/2022 | Wang | B60L 53/30 |
| 2023/0074715 A1* | 3/2023 | Kwon | B64F 1/007 |
| 2023/0167653 A1* | 6/2023 | Waters | G08G 5/26 |
| | | | 244/114 R |
| 2023/0170702 A1* | 6/2023 | Kondo | H02J 3/003 |
| | | | 701/16 |
| 2023/0202682 A1* | 6/2023 | Kiyokami | B64U 70/90 |
| | | | 244/114 R |
| 2023/0349146 A1* | 11/2023 | Vasconi | B64U 70/90 |
| 2023/0373668 A1* | 11/2023 | Kozlenko | B64U 70/90 |
| 2023/0415997 A1* | 12/2023 | Fosnight | B64C 39/024 |
| 2024/0002070 A1* | 1/2024 | Tsai | B60L 53/37 |
| 2024/0010368 A1* | 1/2024 | Liao | B64U 80/10 |
| 2024/0101286 A1* | 3/2024 | Regev | B64U 70/20 |
| 2024/0176367 A1* | 5/2024 | Zhou | G08G 5/22 |
| 2024/0190593 A1* | 6/2024 | Shah | B60L 53/14 |
| 2024/0343426 A1* | 10/2024 | Cornew | B64U 80/25 |
| 2024/0383615 A1* | 11/2024 | Anderson | B65G 1/12 |
| 2024/0383681 A1* | 11/2024 | Bilger | B64U 70/90 |
| 2024/0383685 A1* | 11/2024 | Bilger | B64F 1/32 |
| 2024/0384587 A1* | 11/2024 | Anderson | B64F 1/007 |
| 2024/0391616 A1* | 11/2024 | Dayan | B64U 70/90 |
| 2024/0400242 A1* | 12/2024 | Zhou | B64U 70/90 |
| 2025/0011015 A1* | 1/2025 | Kim | B64U 80/70 |

FOREIGN PATENT DOCUMENTS

| | | |
|---|---|---|
| GB | 2440520 | 2/2008 |
| WO | WO2021230948 A2 | 11/2021 |
| WO | WO2022035681 A2 | 2/2022 |

OTHER PUBLICATIONS

Google, English translation of CN113071697, accessed Jun. 7, 2022 from www.googlepatents.com.

International Search Report and Written Opinion of the International Searching Authority for International application No. PCT/US23/81908, Mar. 13, 20224.

* cited by examiner

AIRCRAFT TAKEOFF AND LANDING APPARATUS

CROSS REFERENCE TO RELATED APPLICATIONS

This application claims priority to U.S. Provisional Patent Application No. 63/429,418, filed Dec. 1, 2022 in the U.S. Patent and Trademark Office, which is incorporated herein by reference.

TECHNICAL FIELD

The present invention relates to the mechanical arts. An embodiment of the invention comprises a landing platform for electric vertical takeoff and landing (EVTOL) aircraft.

BACKGROUND

U.S. Pat. No. 11,053,646 discloses a landing pad for helicopters and other vertical takeoff and landing aircraft and is incorporated by reference herein. U.S. Pat. No. 7,714,536 discloses an apparatus for charging energy supplies in an unmanned aerial vehicle and is incorporated by reference herein. U.S. Pat. No. 9,873,408 discloses a facility for exchanging or replenishing energy sources on unmanned aerial vehicles and is incorporated by reference herein. U.S. Pat. No. 10,351,235 discloses electric powered vertical takeoff and landing aircraft and is incorporated herein by reference. U.S. Pat. No. 11,328,611 discloses a system for vertiport management to support various aspects of aerial on demand mobility services and is incorporated herein.

Electric vertical takeoff and landing aircrafts, known as "EVTOLs", are gaining in popularity as a mode of transportation. Accordingly, there is a need for an apparatus that can facilitate the landing and takeoff of such vehicles.

SUMMARY

One object of the present invention is to provide an apparatus for facilitating vertical takeoff and landing of aircraft. Another object of the present invention is to provide an apparatus adapted for facilitating the landing and takeoff of an electric vertical takeoff and landing aircraft (referred to herein as "EVTOL"). These and other objectives of the invention can be achieved in various embodiments of the invention disclosed herein.

An embodiment of the invention comprises an apparatus adapted to facilitate the takeoff and landing of electric vertical takeoff and landing aircraft (EVTOL).

Another embodiment of the invention comprises an aircraft takeoff and landing apparatus comprising a landing platform and a universal charging assembly. According to a preferred embodiment, the charging assembly is moveable.

According to an embodiment of the invention, the charging assembly comprises a high voltage cable adapted for electrical, magnetic induction positioned within a column having a magnetic plate and multiple access connections. The column can move vertically via a spring, hydraulic mechanism, or other suitable drive means.

According to an embodiment of the invention, the landing platform includes weight sensors that are operatively connected to the charging assembly such that when an EVTOL lands on the platform, the sensors send a signal that triggers the charging assembly to rise upwardly and begin charging the EVTOL.

Another embodiment of the invention comprises a takeoff and landing apparatus comprising a moveable landing platform, a moveable charging apparatus comprising a high voltage cable adapted for electrical, magnetic induction positioned within a vertically moveable column having a magnetic plate and multiple access connections, and weight sensors positioned on the landing platform. The weight sensors are operatively connected to the charging apparatus such that when the sensors detect the landing of an EVTOL on the platform, the sensors trigger the charging apparatus to rise up to contact the EVTOL and begin charging the EVTOL.

According to an embodiment of the invention, the landing platform is moveable.

According to an embodiment of the invention, the landing platform includes wheels. The wheels can be pivotable and rotatable.

Another embodiment of the invention comprises a vertiport comprising one or more aircraft takeoff and landing apparatuses adapted to facilitate the takeoff and landing of electric vertical takeoff and landing aircraft (EVTOL).

According to an embodiment of the invention, the vertiport can comprise a restaurant rooftop and/or a parking deck, or other suitable structure or surface.

Another embodiment of the invention comprises a vertiport comprising at least one takeoff and landing apparatus comprising a moveable landing platform and a moveable charging apparatus. The landing platform comprises weight sensors, lights, and wheels. The charging apparatus comprises a high voltage cable adapted for electrical, magnetic induction positioned within a column having an electromagnetic plate and multiple access connections. The column can move vertically via a spring or hydraulic means. The weight sensors are operatively connected such that when an EVTOL lands on the platform, the sensors trigger the charging apparatus to rise and begin charging the EVTOL. According to an embodiment, the takeoff and landing apparatus can be located on a restaurant rooftop, parking deck, or other suitable structure or surface.

Another embodiment of the invention comprises an apparatus for facilitating the takeoff and landing of electric vertical takeoff and landing aircraft comprising a landing platform, at least one charging member operatively connected to a power source and adapted to connect to and charge an electric vertical takeoff and landing aircraft, wherein the charging member is positioned within an opening formed in the landing platform and vertically moveable in relation to the landing platform, and at least one weight sensor positioned on the landing platform and operatively connected to the charging member whereby the charging member moves upwardly in relation to the landing platform when the at least weight sensor detects weight on the landing platform.

According to an embodiment of the invention, the charging member comprises a cable adapted for electrical magnetic induction operatively connected to an electric power source and an electromagnetic plate positioned proximate a top of the charging member whereby an electric vertical takeoff and landing aircraft positioned on the electromagnetic plate is charged by electromagnetic induction.

According to an embodiment of the invention, the charging member has at least one access input adapted to receive a charging cord connected to electric vertical takeoff and landing aircraft positioned on the landing platform. The charging member can be moveable between a first position wherein the top of the charging member is substantially co-planar with the upper surface of the landing platform and a second position in which the access point is positioned above the landing platform. The charging member can be moved to the second position when the sensor detects weight on the landing platform.

According to an embodiment of the invention, each charging member has multiple universal access inputs.

According to an embodiment of the invention, the charging member is moveable between a first position wherein the top of the charging member is substantially co-planar with an upper surface of the landing platform and a second position wherein the access point is positioned above the upper surface of the landing platform. The charging member can be moved to the second position when the sensor detects weight on the landing platform.

According to an embodiment of the invention, the landing platform is substantially rectangular. A first charging column can be positioned proximate a first corner of the landing platform, a second charging column can be positioned proximate a second corner of the landing platform, a third charging column can be positioned proximate a third corner of the landing platform, and a fourth charging column can be positioned proximate a fourth corner of the landing platform.

According to another embodiment of the invention, a charging section can be positioned on the upper surface of the landing platform and adapted to provide conductive charging to an electric vertical takeoff and landing aircraft positioned on the charging section.

According to another embodiment of the invention, a first support post can be positioned proximate a first corner of a substantially rectangular landing platform, a second support post can be positioned proximate a second corner of the landing platform, a third support post can be positioned proximate a third corner of the landing platform, and a fourth support post can be positioned proximate a fourth corner of the landing platform. A first weight sensor can be positioned in the first support post, a second weight sensor can be positioned in the second support post, a third weight sensor can be positioned in the third support post, and a fourth weight sensor can be positioned in fourth support post. A first wheel can be attached at a base of the first support post, a second wheel can be attached at a base of the second support post, a third wheel can be attached at a base of the third support post, and a fourth wheel can be attached at a base of the fourth support post, whereby the landing platform is moveable.

Another embodiment of the invention comprises a vertiport comprising a plurality of apparatuses for charging electric vertical takeoff and landing aircraft. Each apparatus can comprise a landing platform, and at least one charging column operatively connected to a power source and adapted to connect to and charge an electric vertical takeoff and landing aircraft. The charging member can be positioned within an opening formed in the landing platform and can move vertically in relation to the landing platform. At least one weight sensor can be positioned on the landing platform and operatively connected to the charging member whereby the charging member moves upwardly in relation to the landing platform when the weight sensor detects weight on the landing platform.

According to an embodiment of the invention, the vertiport can be located on a restaurant rooftop or parking deck.

Another embodiment of the invention comprises a method of charging an electric vertical takeoff and landing aircraft. The method comprises the step of providing an apparatus for facilitating the takeoff and landing of an electric vertical takeoff and landing aircraft comprising a landing platform, at least one charging member operatively connected to a power source and adapted to connect to and charge an electric vertical takeoff and landing aircraft, the charging member positioned within an opening formed in the landing platform and vertically moveable in relation to the landing platform between a first position wherein a top of the at least one charging member is substantially co-planar with an upper surface of the landing platform and a second position wherein the top of the at least one charging member is elevated above the upper surface of the landing platform, and at least one weight sensor positioned on the landing platform and operatively connected to the charging member whereby the charging member moves upwardly in relation to the landing platform when the weight sensor detects weight on the landing platform. The method can further comprise the steps of landing the electric vertical takeoff and landing aircraft on the landing platform, moving the charging member from the first position to the second position in response to the weight sensor detecting the weight of the electric vertical takeoff and landing aircraft on the landing platform, and connecting a battery of the electric vertical takeoff and landing aircraft to the charging member to charge the battery. According to an embodiment of the invention, the method can further comprise the steps of removing the electric vertical takeoff and landing aircraft from the landing platform, and moving the charging member from the second position to the first position in response to the weight sensor detecting no weight on the landing platform.

DETAILED DESCRIPTION OF PREFERRED EMBODIMENTS

Figure 1:
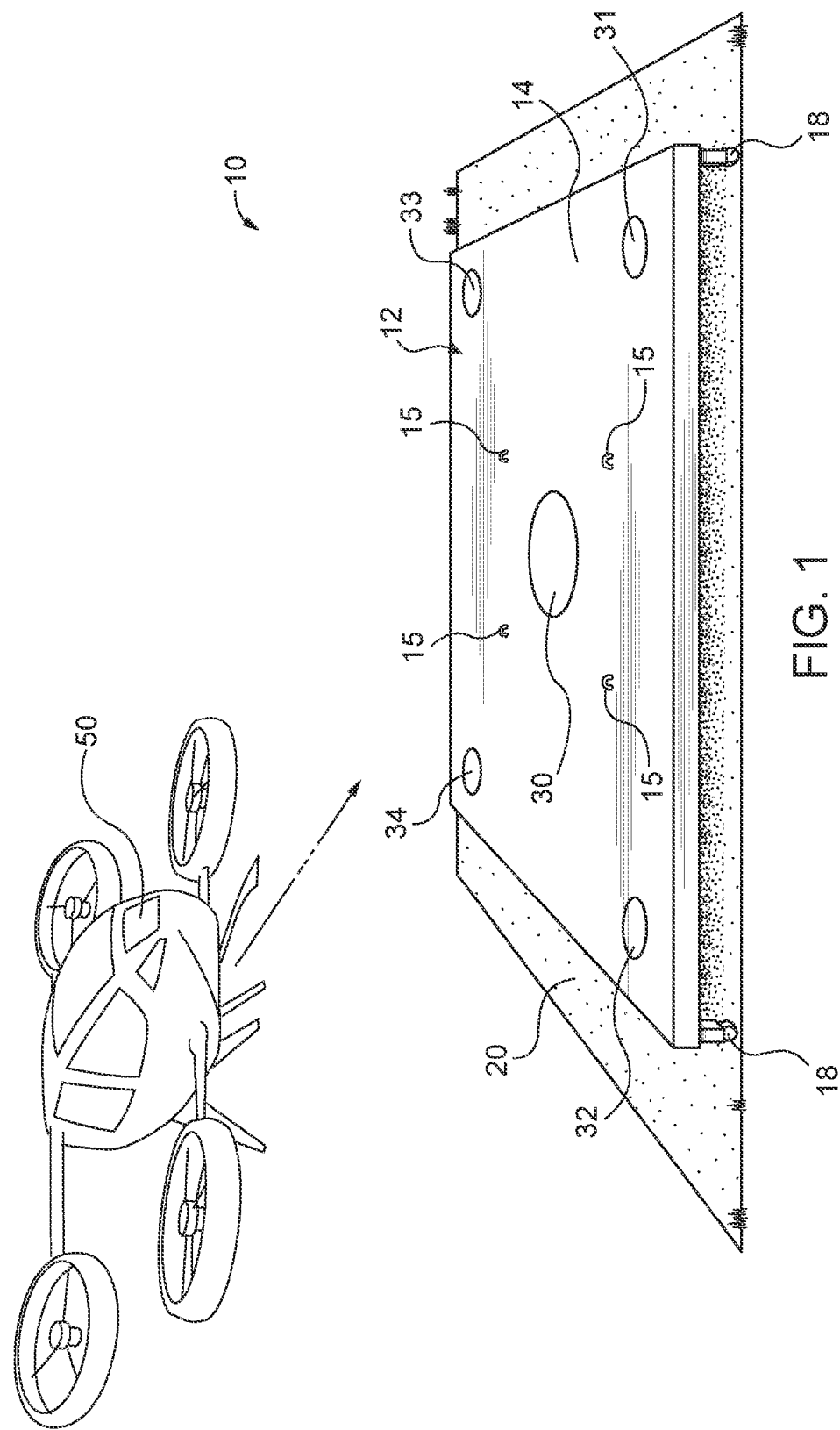
FIG. 1 is an environmental perspective view of an aircraft takeoff and landing apparatus according to an embodiment of the invention.

An aircraft takeoff and landing apparatus according to a preferred embodiment of the invention is illustrated in FIGS. 1-8 and shown generally at reference numeral 10. The apparatus 10 comprises a moveable landing platform 12 and a universal charging assembly. The apparatus 10 is particularly suited for use with electric vertical takeoff and landing aircraft ("EVTOL").

EVTOL, as used herein, refers generally to electrically powered aircraft that can takeoff and land vertically or substantially vertically. An example of an EVTOL is disclosed in U.S. Pat. No. 10,351,235, which is incorporated herein by reference. EVTOL, as used herein, includes aircraft powered solely by electricity and hybrid vehicles that can utilize both electricity and fossil fuels.

Figure 2:
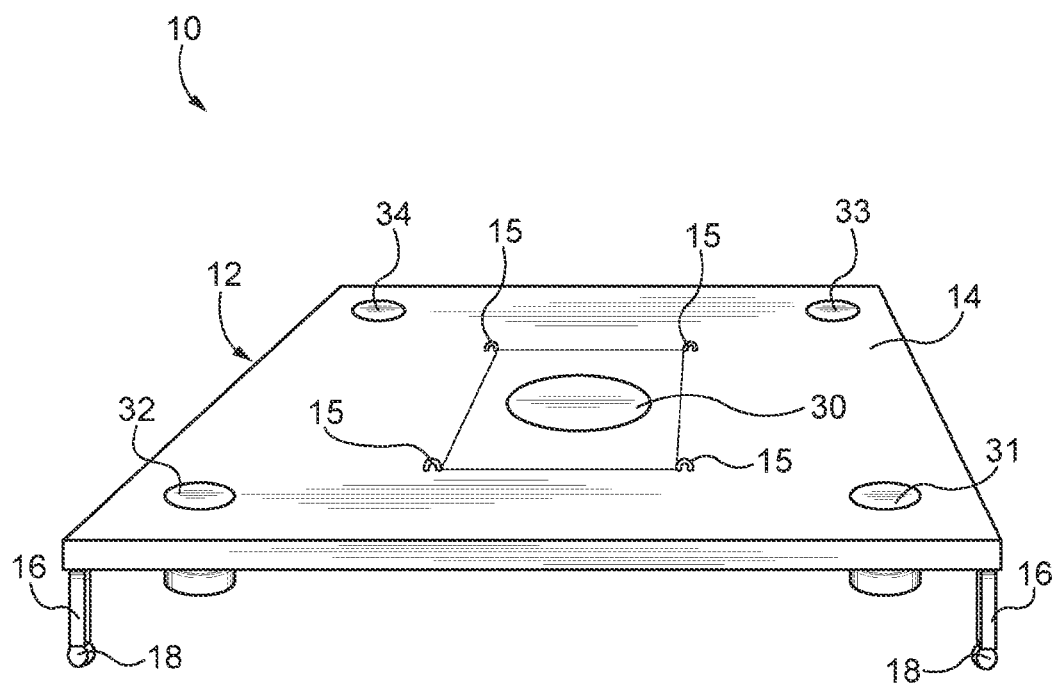
FIG. 2 is another perspective view of the apparatus of FIG. 1.

The landing platform 12 comprises a generally rectangular, flat deck 14, as shown in FIGS. 1 and 2. The deck 14 is supported on four vertically oriented support posts 16 positioned proximate the four corners of the flat member 14. The support posts 16 can be attached to the underside of the deck 14 and extend vertically therefrom. Wheels 18 can be attached proximate the bottom of each support post 16, as shown in FIGS. 2-6. FIG. 7 illustrates an alternative embodiment, in which a pair of wheels 18 can be positioned on opposite sides of the support post 16.

Preferably, the wheels 18 are pivotably attached to the support posts 16. According to an embodiment, the wheels 18 can be swivel caster wheels.

The wheels 18 of the landing platform 12 can sit on a base foundation 20, as shown in FIG. 1. The base foundation 20 defines a final approach and takeoff area. The base foundation 20 can be comprised of Portland concrete with a rough surface, or other suitable material. The deck 14 of the landing platform 12 defines a takeoff and landing area. Lights can be positioned on the deck 14 of the landing platform 12.

Each support post 16 comprises a weight sensor, such as a hydraulic weight sensor, capacitive weight sensor, or electromagnetic force weight sensor. The weight sensors can comprise hydraulic load cells, pneumatic load cells, inductive load cells or other suitable load cells. The weight sensors can include a computer processor. The weight sensors 16 are operatively connected to the landing platform 12 so that they detect when a load bearing weight is on the deck 14. The apparatus 10 can utilize technology of the weighing system disclosed in U.S. Pat. No. 6,124,554, which is incorporated by reference herein.

Figure 3:
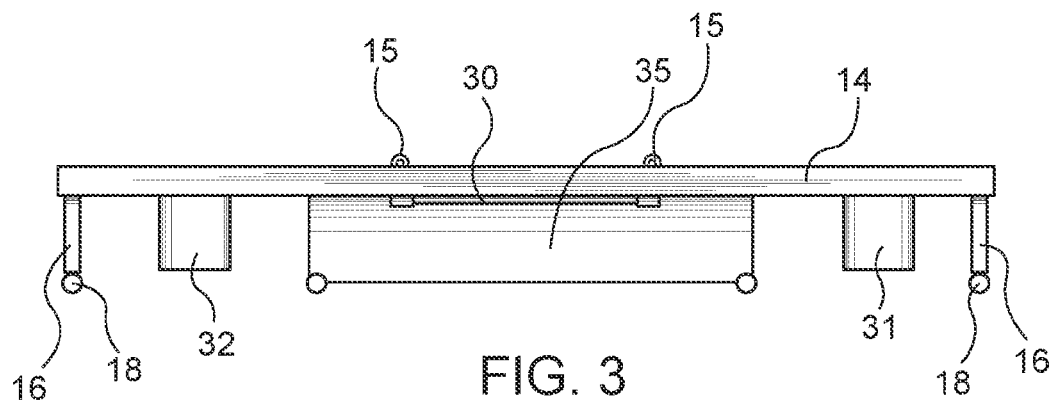
FIG. 3 is a side view of the apparatus of FIG. 1.
Figure 4:
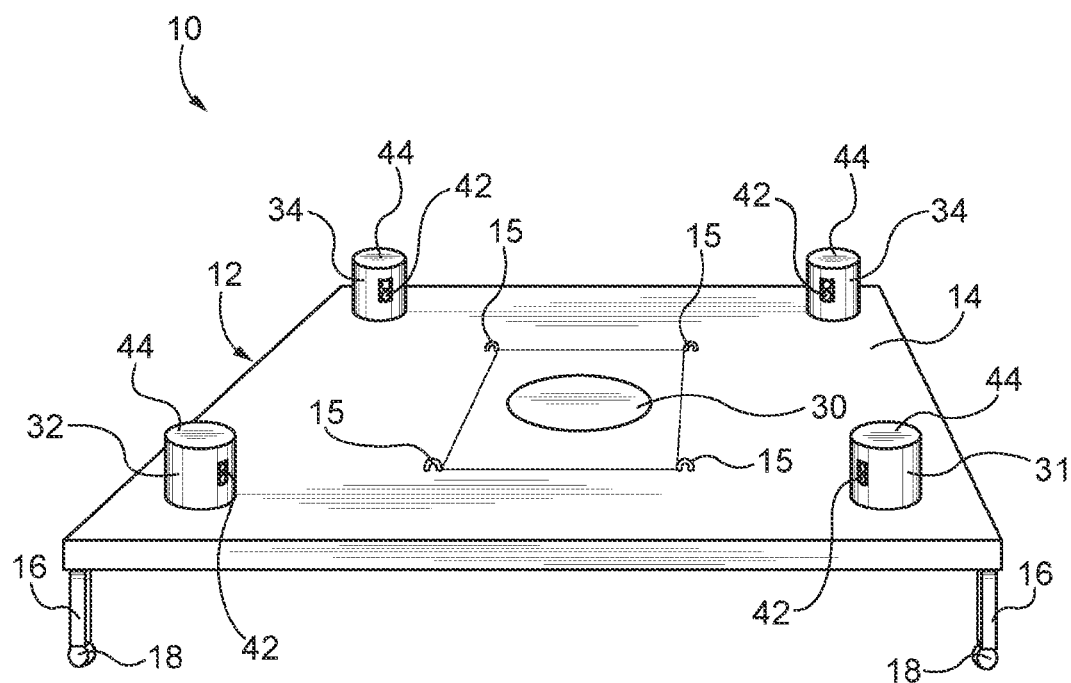
FIG. 4 is another perspective view of the apparatus of FIG. 1.
Figure 5:
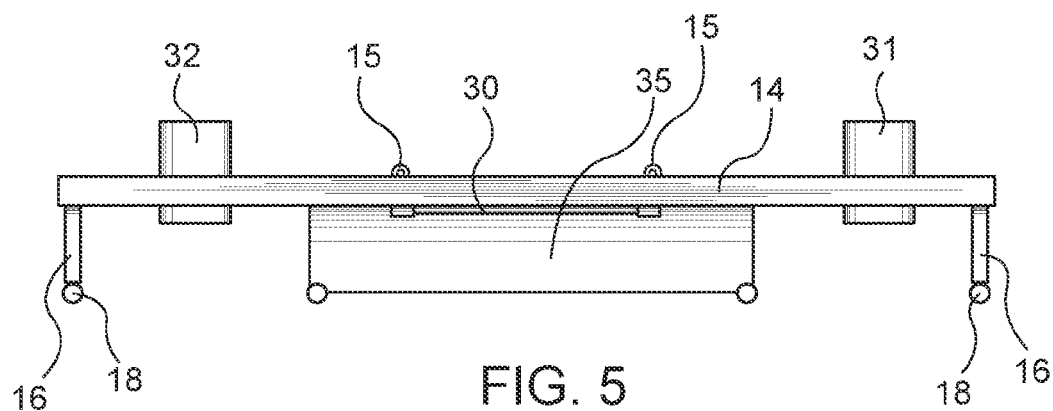
FIG. 5 is a side view of the apparatus of FIG. 1.
Figure 6:
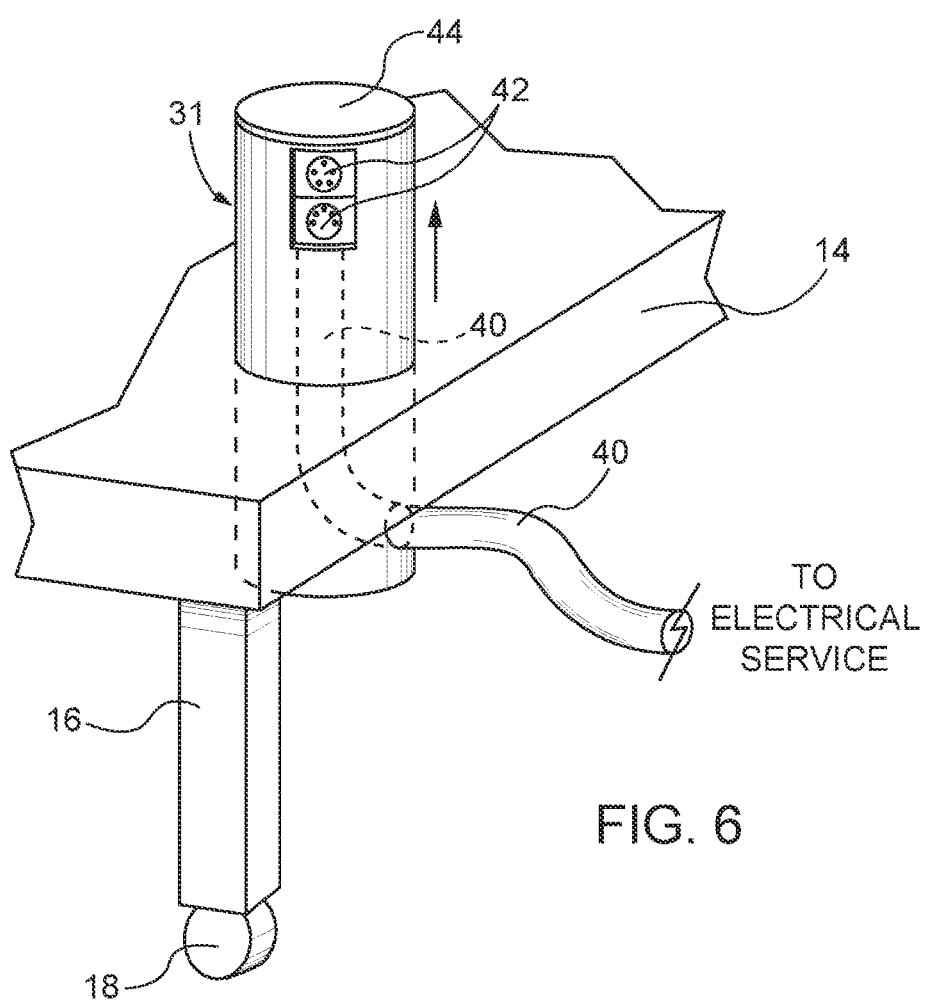
FIG. 6 is a partial perspective view of the apparatus of FIG. 1.
Figure 7:
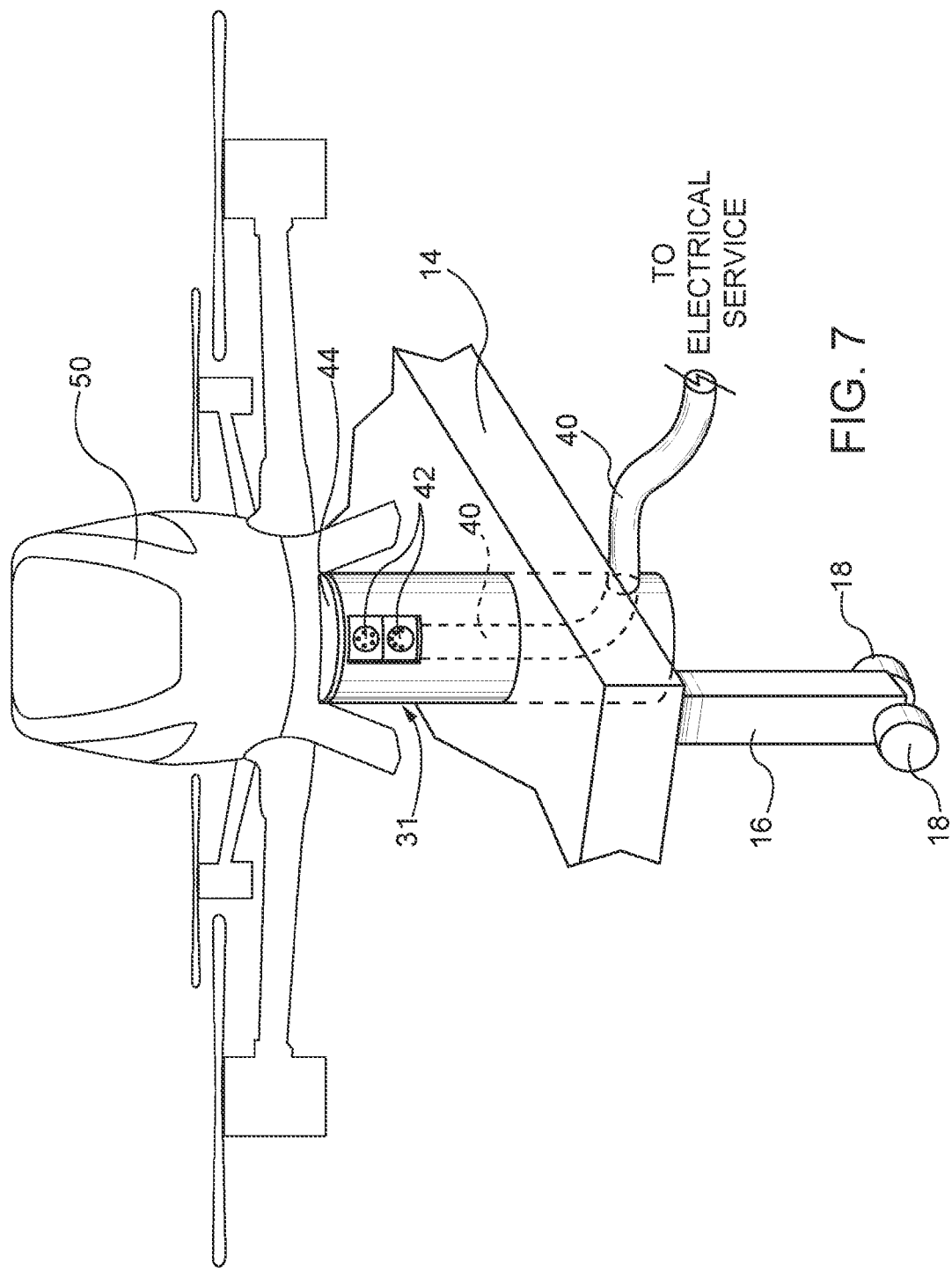
FIG. 7 is another partial perspective view of the apparatus of FIG. 1.

The charging assembly comprises a plurality of cylindrical charging units 31, 32, 33, 34 positioned within circular openings formed in the deck 14 of the landing platform 12, as shown in FIGS. 1-6. The charging columns 31, 32, 33, 34 can be positioned proximate the four corners of the deck 14, as shown in FIGS. 2 and 4. Each column 31, 32, 33, 34 comprises a high/low megawatt cable 40, universal multiple access inputs 42, and an electromagnetic plate 44, as shown with regard to column 31 in FIG. 6. The electromagnetic plate 44 can comprise an electromagnetic coil and a ferromagnetic core. The electromagnetic plate 44 can be positioned at the top of each column 31, 32, 33, 34, as shown with regard to column 31 in FIG. 6. The charging assembly includes an electrical power source 35, shown in FIG. 3. One end of the cable 40 connects to the electrical power source 35 and the opposite end operatively connects to the universal multiple access inputs 42, as shown in FIG. 6. In addition, the electrical power source 35 provides electrical current to the electromagnetic plate 44 to produce an electromagnetic field that can power an electric battery via electromagnetic induction.

Figure 8:
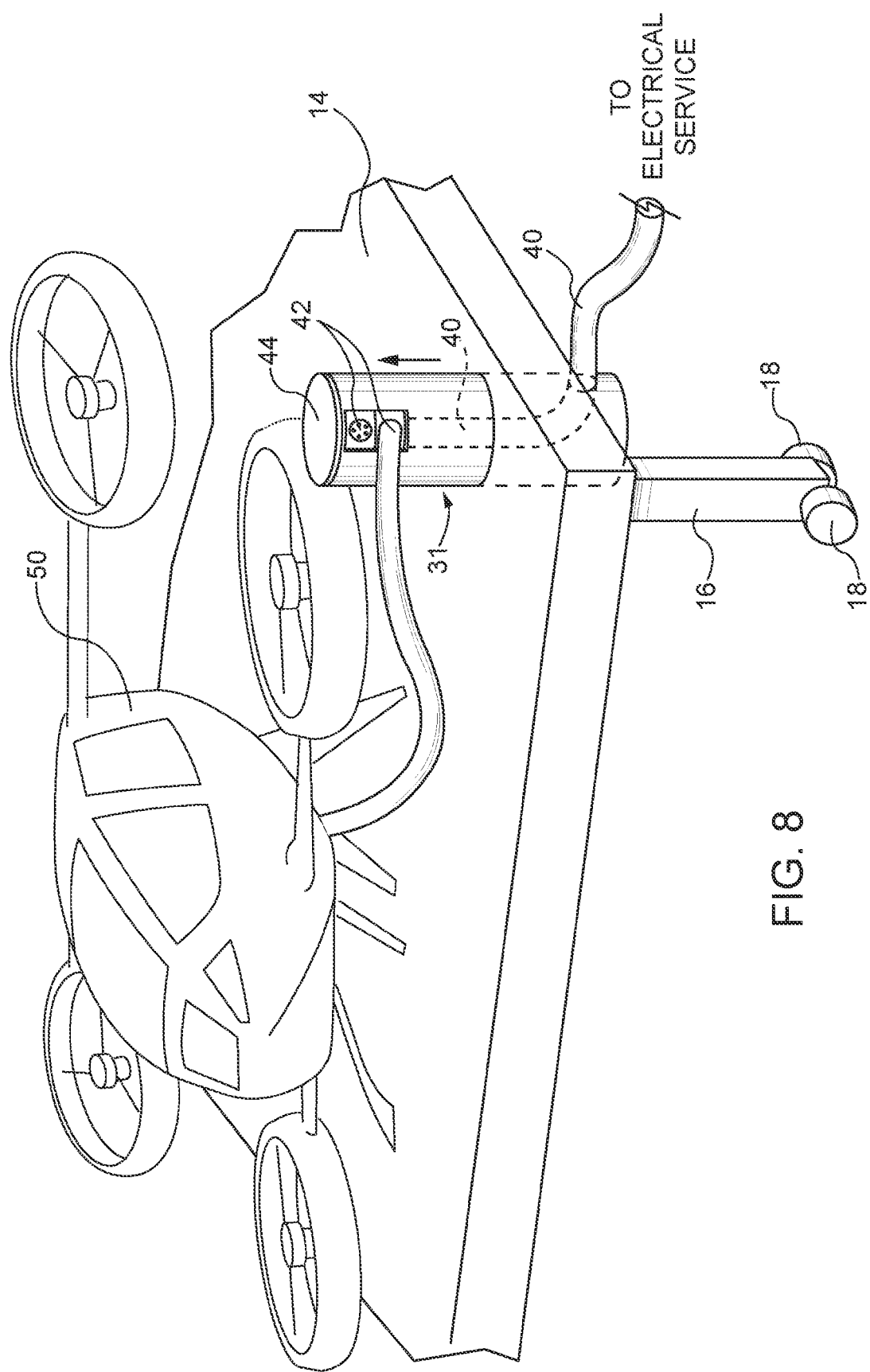
FIG. 8 is another partial perspective view of the apparatus of FIG. 1.

The charging columns 31, 32, 33, 34 are vertically moveable. The charging columns 31, 32, 33, 34 can move from a standby position in which the top of each column 31, 32, 33, 34 is substantially co-planar with the upper surface of the deck 14, as shown in FIG. 2, to a charging position in which the top of the charging columns 31, 32, 33, 34 are elevated well above the landing platform 12, as shown in FIGS. 4 and 6. As such, the access points 42 and electromagnetic plate 44 of each charging columns 31, 32, 33, 34 are positioned well above the landing platform 12 and easily accessible by the EVTOL 50, as shown in FIGS. 7 and 8. The charging assembly can include a drive mechanism for moving the charging columns 31, 32, 33, 34 up and down. The drive mechanism can be a spring, a hydraulic mechanism, or other suitable drive means.

The charging assembly can also include a substantially flat, stationary charging section 30. The charging section 30 can be located proximate the center of the top surface of the deck 14 of the landing platform 12, as shown in FIG. 1. The charging section 30 can be integrally formed in the deck 14. The charging section 30 is adapted to provide conductive charging to an electric vertical takeoff landing aircraft (EVTOL). The electric power source 35 is operatively connected to the charging section 30 to provide electricity to the charging section 30. The power source 35 can be positioned below the charging section 30, as shown in FIG. 3.

The charging columns 31, 32, 33, 34 are operatively connected to the weight sensors 16, such that a load bearing weight on the deck 14 of the landing platform 12 triggers the sensors 16 to send a signal causing the charging units 31, 32, 33, 34 to elevate from the standby position, shown in FIG. 2, to the charging position, shown in FIG. 4.

FIG. 1 shows an EVTOL 50 approaching the apparatus 10 to land. When the EVTOL 50 lands on the deck 14 of the landing platform 12, the weight sensors 16 detect the load exerted on the deck 14 by the EVTOL 50, which causes the sensors 16 to send a signal to elevate the charging units 31, 32, 33, 34 to the charging position, shown in FIG. 4. The EVTOL 50 can be connected to the most conveniently located charging column 31, 32, 33, 34.

The charging assembly can include a computing device operatively connected to the weight sensors and the charging columns 31, 32, 33, 34. The computing device can comprise a computer processor and a non-transitory computer readable storage medium comprising software comprising programming instructions that, when executed, cause the processor to analyze the data transmitted by the weight sensors 16 and send instructions to the drive mechanism for adjusting the position of the charging columns 31, 32, 33, 34 in response to the data transmitted by the weight sensors 16. The computing device can be programmed to send a signal to elevate the charging columns 31, 32, 33, 34 to the charging position when one or more weight sensors 16 detects a minimum weight on the deck 14 of the landing platform 12. According to a preferred embodiment, the minimum weight can be at least 0.5 pounds.

The electromagnetic plate 44 can serve as an attachment point for the underside of the EVTOL 50 during charging. As shown in FIG. 7, the EVTOL 50 can land directly on the electromagnetic plate 44, and the electrical battery of the EVTOL 50 is charged by electromagnetic induction. The electromagnetic plate 44 transmits a magnetic field that charges the battery of the EVTOL 50. Magnetic attraction between electromagnetic plate 44 and material of the EVTOL 50 can help maintain the EVTOL 50 securely in position during charging. Alternatively, the EVTOL 50 can land directly on the deck proximate to the one of the charging columns 31, 32, 33, 34 and be charged by connecting the cable 45 to the EVTOL 50 and one of the charging access points 42, as shown in FIG. 8. In another alternative, the EVTOL 50 can land directly on the charging section 30 of the deck 14 and be charged by conductive charging. As such, the apparatus 10 provides multiple convenient charging options to accommodate a variety of vehicles.

Charging begins as soon as the EVTOL 50 lands and is connected to one of the charging columns 31, 32, 33, 34 or charging section 30. This maximizes charging time, which is important as it can typically take about thirty minutes or more to sufficiently recharge an EVTOL.

The multiple charging locations (charging section 30 and charging columns 31, 32, 33, 34) provided by the apparatus 10 can accommodate the variety of EVTOL designs and charging mechanisms. EVTOLs can have multiple battery locations, and there is not a single standard way of charging EVTOLs. The charging assembly of the apparatus 10 enables multiple cables going to individual batteries, a single cable going to a central charging battery, and/or contactless charging. Also, the multiple charging locations (charging section 30 and charging columns 31, 32, 33, 34) conveniently accommodates the variation in overall wingspan and body size of various EVTOLs.

While the apparatus 10 is shown and described as having four charging columns 31, 32, 33, 34 positioned proximate the corners of the deck 14 of the landing platform 12, alternative embodiments of the invention can include greater or fewer than four charging columns positioned at a variety of locations on the deck 14. Likewise, alternative embodiments can include more than one charging section 30.

When an EVTOL 50 approaches for landing, as shown in FIG. 1, the landing platform 12 can be moved via the wheels 18 in a variety of directions along a horizontal plane to accommodate the incoming path of the EVTOL 50. Also, the landing platform 12 can be adapted so that the deck 14 can move vertically. The landing platform 12 allows for multiple traversing speeds and directions.

Upon landing of an EVTOL 50, the landing platform 12 relocates in such direction when triggered by the gross vehicle weight of the EVTOL 50. The landing platform 12 begins traversing to a safety area, and charging is initiated to the EVTOL via electrical, magnetic, and/or induction at the appropriate rate of voltage and amperage. Multiple attachment/tiedown safety hooks 15 can be positioned on the deck 14 of the landing platform 12, as shown in FIG. 1. The safety hooks 15 are tie down areas for safely securing the EVTOL 50 during deplaning and boarding while on the landing platform 12.

According to an embodiment of the invention, the takeoff and landing apparatus 10 can be transported by one or more semi-trailer trucks and unloaded and assembled at any desired location. According to a preferred embodiment, the apparatus 10 can be situated in an urban location, such as a restaurant rooftop or parking deck. The apparatus 10 can be promoted, marketed and/or sold under the name UPTUG.

Another embodiment of the invention comprises an airport for vertical takeoff and landing aircraft, generally referred to as a vertiport, that comprises the takeoff and landing apparatus 10. The vertiport can be adapted to cater particularly to electric vertical takeoff and landing aircraft. The vertiport can comprise a plurality of the takeoff and landing apparatus 10. The vertiport can be located on any structure or surface. According to a preferred embodiment of the invention, the vertiport can be situated in an urban location, such as a restaurant rooftop or parking deck. The vertiport can be promoted and/or marketed under the mark URBANPORT.

Figure 9:
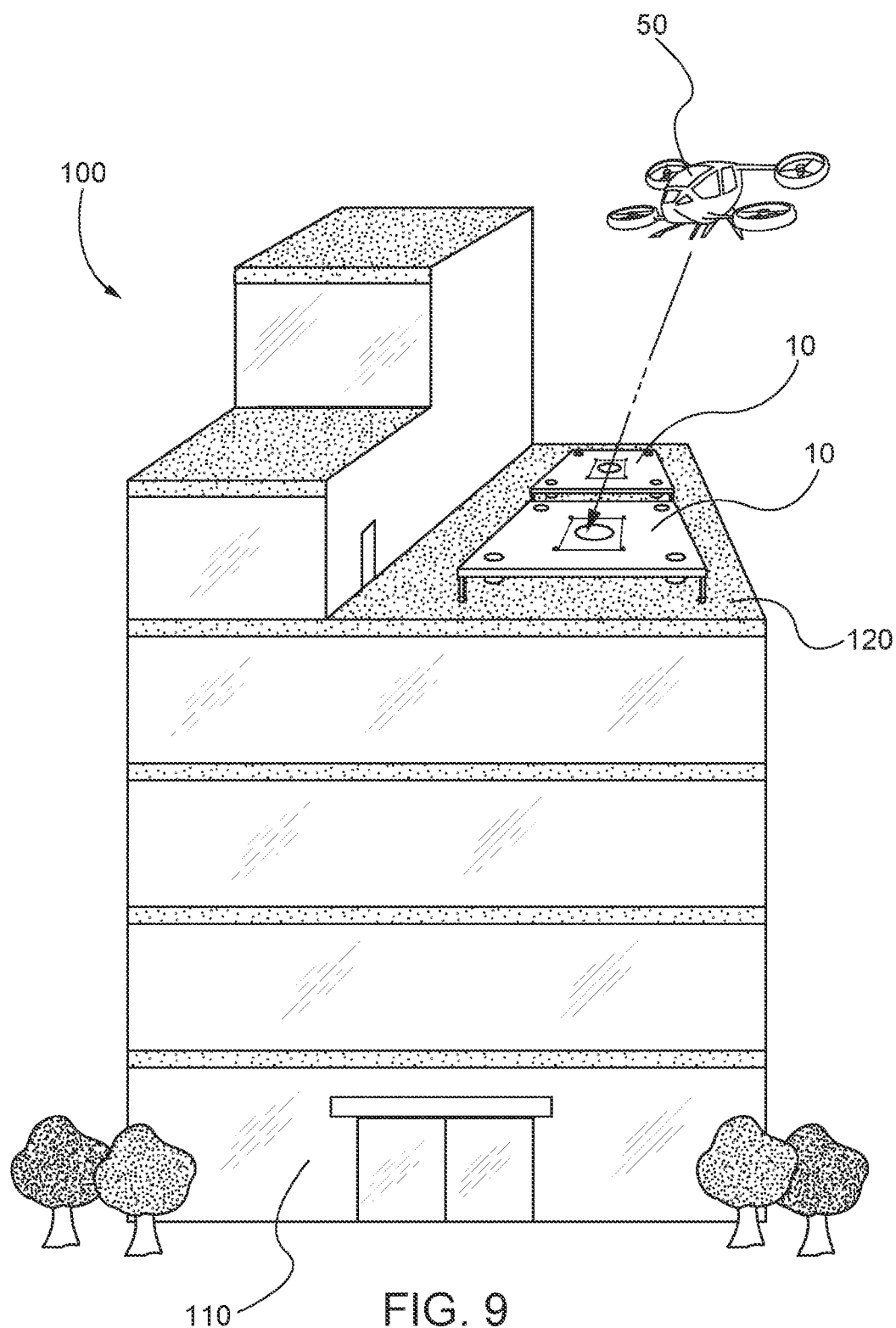
FIG. 9 is a perspective view of a vertiport according to an embodiment of the invention.

A vertiport according to an embodiment of the invention is illustrated in FIG. 9 and shown generally at reference numeral 100. As shown in FIG. 9, the vertiport comprises a plurality of the takeoff and landing apparatus 10 positioned on the rooftop 120 of a building 110.

An aircraft takeoff and landing apparatus and method of using same are described above. Various changes can be made to the invention without departing from its scope. The above description of various embodiments of the invention are provided for the purpose of illustration only and not limitation—the invention being defined by the claims and equivalents thereof.

What is claimed is:

1. An apparatus for facilitating the takeoff and landing of electric vertical takeoff and landing aircraft comprising:
   (a) a landing platform;
   (b) at least one charging member operatively connected to a power source and adapted to connect to and charge an electric vertical takeoff and landing aircraft, the at least one charging member positioned within an opening formed in the landing platform and vertically moveable in relation to the landing platform; and
   (c) at least one weight sensor positioned on the landing platform and operatively connected to the at least one charging member whereby the at least one charging member moves upwardly in relation to the landing platform when the at least weight sensor detects weight on the landing platform.

2. The apparatus according to claim 1, wherein the at least one charging member comprises a cable adapted for electrical magnetic induction operatively connected to an electric power source and an electromagnetic plate positioned proximate a top of the charging member whereby an electric vertical takeoff and landing aircraft positioned on the electromagnetic plate is charged by electromagnetic induction.

3. The apparatus according to claim 2, wherein the landing platform is substantially rectangular.

4. The apparatus according to claim 3, wherein the at least one charging member comprises a first column, a second column, a third column, and a fourth column, the first column positioned proximate a first corner of the landing platform, the second column positioned proximate a second corner of the landing platform, the third column positioned proximate a third corner of the landing platform, and the fourth column positioned proximate a fourth corner of the landing platform.

5. The apparatus according to claim 2, wherein the at least one charging member further comprises at least one access input adapted to receive a charging cord connected to electric vertical takeoff and landing aircraft positioned on the landing platform.

6. The apparatus according to claim 5, wherein the at least one charging member is moveable between a first position wherein the top of the at least one charging member is substantially co-planar with an upper surface of the landing platform and a second position wherein the at least one access point is positioned above the upper surface of the landing platform, and further wherein the at least one charging member is moved to the second position when the at least one sensor detects weight on the landing platform.

7. The apparatus according to claim 5, wherein the at least one access input comprises universal multiple access inputs.

8. The apparatus according to claim 5, further comprising a charging section positioned on the upper surface of the landing platform and adapted to provide conductive charging to the electric vertical takeoff and landing aircraft positioned on the charging section.

9. The apparatus according to claim 1, wherein the landing platform is substantially rectangular, and further comprising a first support post, a second support post, a third support post, and a fourth support post for supporting the landing platform above a ground surface, the first support post positioned proximate a first corner of the landing platform, the second support post positioned proximate a second corner of the landing platform, the third support post positioned proximate a third corner of the landing platform, and the fourth support post positioned proximate a fourth corner of the landing platform.

10. The apparatus according to claim 9, wherein the at least one weight sensor comprises a first weight sensor positioned in the first support post, a second weight sensor positioned in the second support post, a third weight sensor positioned in the third support post, and a fourth weight sensor positioned in fourth support post.

11. The apparatus according to claim 9, further comprising a first wheel attached at a base of the first support post, a second wheel attached at a base of the second support post, a third wheel attached at a base of the third support post, and a fourth wheel attached at a base of the fourth support post, whereby the landing platform is moveable.

12. The apparatus according to claim 1, wherein the at least one charging member comprises at least one access input adapted to receive a charging cord connected to an electric vertical takeoff and landing aircraft positioned on the landing platform.

13. The apparatus according to claim 12, wherein the at least one access input comprises universal multiple access inputs.

14. The apparatus according to claim 12, wherein the at least one charging member is moveable between a first position wherein the top of the at least one charging member is substantially co-planar with an upper surface of the landing platform and a second position wherein the at least one access point is positioned above the landing platform, and further wherein the at least one charging member is moved to the second position when the at least one sensor detects weight on the landing platform.

15. A vertiport comprising a plurality of apparatuses for charging electric vertical takeoff and landing aircraft, wherein each apparatus comprises:
 (a) a landing platform;
 (b) at least one charging column operatively connected to a power source and adapted to connect to and charge an electric vertical takeoff and landing aircraft, the at least one charging member positioned within an opening formed in the landing platform and vertically moveable in relation to the landing platform; and
 (c) at least one weight sensor positioned on the landing platform and operatively connected to the at least one charging member whereby the at least one charging member moves upwardly in relation to the landing platform when the at least weight sensor detects weight on the landing platform.

16. The vertiport according to claim 15, wherein the vertiport is located on a restaurant rooftop or parking deck.

17. The vertiport according to claim 15, wherein the at least one charging column comprises at least one access input adapted to receive a charging cord connected to an electric vertical takeoff and landing aircraft positioned on the landing platform.

18. The vertiport according to claim 17, wherein the at least one charging column is moveable between a first position wherein the top of the at least one charging column is substantially co-planar with an upper surface of the landing platform and a second position wherein the at least one access point is positioned above the landing platform, and further wherein the at least one charging column is moved to the second position when the at least one sensor detects weight on the landing platform.

19. A method of charging an electric vertical takeoff and landing aircraft comprising the steps of:
 (a) providing an apparatus for facilitating the takeoff and landing of an electric vertical takeoff and landing aircraft comprising:
  (i) a landing platform;
  (ii) at least one charging member operatively connected to a power source and adapted to connect to and charge an electric vertical takeoff and landing aircraft, the at least one charging member positioned within an opening formed in the landing platform and vertically moveable in relation to the landing platform between a first position wherein a top of the at least one charging member is substantially co-planar with an upper surface of the landing platform and a second position wherein the top of the at least one charging member is elevated above the upper surface of the landing platform, and
  (iii) at least one weight sensor positioned on the landing platform and operatively connected to the at least one charging member whereby the at least one charging member moves upwardly in relation to the landing platform when the at least weight sensor detects weight on the landing platform;
 (b) landing the electric vertical takeoff and landing aircraft on the landing platform;
 (c) moving the at least one charging member from the first position to the second position in response to the at least one weight sensor detecting the weight of the electric vertical takeoff and landing aircraft on the landing platform; and
 (d) connecting a battery of the electric vertical takeoff and landing aircraft to the at least one charging member to charge the battery.

20. The method according to claim 19, further comprising the steps of:
 (a) removing the electric vertical takeoff and landing aircraft from the landing platform; and
 (b) moving the at least one charging member from the second position to the first position in response to the at least one weight sensor detecting no weight on the landing platform.

* * * * *